United States Patent [19]

Römer

[11] Patent Number: 5,667,203
[45] Date of Patent: Sep. 16, 1997

[54] AIR-SPRING LEG

[75] Inventor: Matthias Römer, Weinstadt, Germany

[73] Assignee: Mercedes-Benz AG, Stuttgart, Germany

[21] Appl. No.: 615,696

[22] Filed: Mar. 13, 1996

[30] Foreign Application Priority Data

Mar. 13, 1995 [DE] Germany .................. 195 08 980.4

[51] Int. Cl.$^6$ ................ B60G 11/30; F16F 9/04
[52] U.S. Cl. .................. 267/64.23; 267/64.27; 188/322.16
[58] Field of Search ............. 188/322.16, 322.11, 188/321.11, 668; 280/708, 711; 92/98 R, 98 D; 267/64.21, 64.23, 64.24, 64.27

[56] References Cited

U.S. PATENT DOCUMENTS

| | | | |
|---|---|---|---|
| 2,980,441 | 4/1961 | Timpner et al. | 267/64.21 |
| 3,010,715 | 11/1961 | Slemmons et al. | 267/64.24 |
| 4,325,541 | 4/1982 | Korosladanyi et al. | 267/64.21 |
| 4,555,096 | 11/1985 | Pryor | 267/64.21 |
| 4,635,745 | 1/1987 | Myers et al. | 767/64.24 |
| 5,129,634 | 7/1992 | Harris | 267/64.24 |
| 5,192,100 | 3/1993 | Rumpel et al. | 280/668 |
| 5,454,455 | 10/1995 | Kundmuller et al. | 188/322.16 |

FOREIGN PATENT DOCUMENTS

| | | |
|---|---|---|
| 0034068A2 | 8/1981 | European Pat. Off. . |
| 0 204 913 | 12/1986 | European Pat. Off. . |
| 0225271A1 | 6/1987 | European Pat. Off. . |
| 0259245A2 | 3/1988 | European Pat. Off. . |
| 0318696A2 | 6/1989 | European Pat. Off. . |
| 1 333 085 | 9/1962 | France . |
| 2 574 717 | 6/1986 | France . |
| 3445984A1 | 6/1986 | Germany . |
| 38 27 760 | 3/1989 | Germany . |
| 3828203A1 | 3/1990 | Germany . |
| 4010982A1 | 10/1990 | Germany . |
| 41 35 900 | 5/1993 | Germany . |
| 195 08 854 | 2/1996 | Germany . |
| 3-244844 | 10/1991 | Japan . |

OTHER PUBLICATIONS

Japanese Abstract No. 60–56612, vol. 9, No. 191 (M–402) (1914) Aug. 7, 1985.

Search Report, Jun. 26, 1996, Great Britain.

Primary Examiner—Robert J. Oberleitner
Assistant Examiner—Chris Schwartz
Attorney, Agent, or Firm—Evenson, McKeown, Edwards & Lenahan, P.L.L.C.

[57] ABSTRACT

An air-spring leg is disclosed having a telescopic element preferably in the form of a shock absorber and having an air chamber of variable volume which is combined with said telescopic element. A casing part is connected for wobbling movement to the cylinder of the telescopic element and also another casing part is provided capable of wobbling movement relative to the piston or piston rod of the telescopic element. A bellows is arranged between these casing parts.

11 Claims, 4 Drawing Sheets

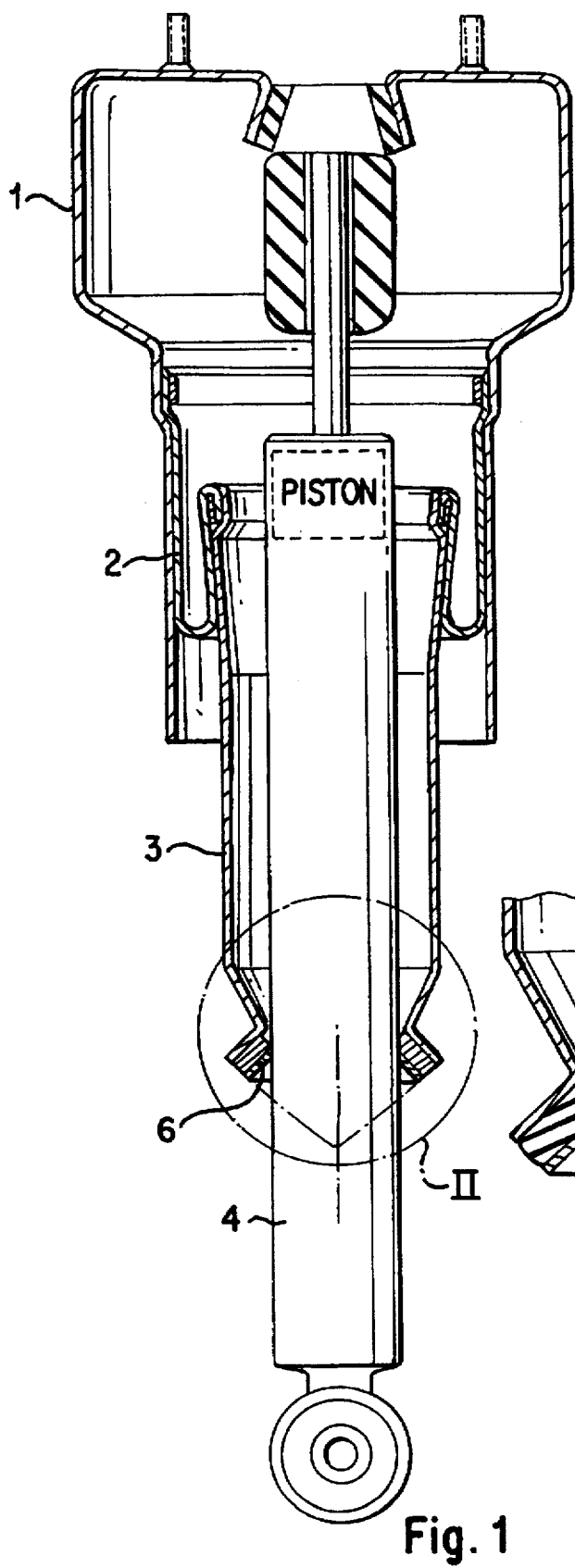
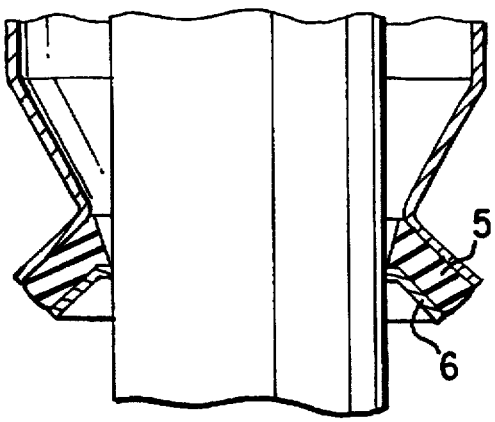
Fig. 1
Fig. 2

AIR-SPRING LEG

BACKGROUND AND SUMMARY OF THE INVENTION

The invention relates to an air-spring leg having a telescopic element which is preferably in the form of a shock absorber and which comprises a cylinder, a piston retractable therein, and an air chamber of variable volume which is combined with the telescopic element and is surrounded by a first casing part connected for wobbling movement to the piston, by a second casing part fastened to the cylinder and by a bellows arranged between the casing parts, and which substantially concentrically surrounds the telescopic element, at least over an axial portion, while the one casing part has a diameter smaller than that of the other casing part and is axially retractable into the other casing part during inward spring strokes.

Air-spring legs of this type are known, for example, from German Patent Document DE 34 45 984 A1. In the case of vehicle springs, the casing part connected for wobbling movement to the piston or its piston rod is usually fastened to the chassis or the body of the vehicle, so that, during suspension strokes, more or less large wobbling movements can occur between this casing part and the telescopic element if, during suspension strokes, the telescopic element fastened between the chassis or vehicle body and the axle or wheel makes swivelling movements relative to the chassis or vehicle body.

In air-spring legs of this kind, the casing part on the cylinder side is fixed to the cylinder, so that, when swivelling movements of the telescopic element relative to the vehicle body or chassis are made, distinct radial movements occur between the casing parts. The bellows must accordingly permit great movability of the casing parts relative to one another in the radial direction.

German Patent Document DE 40 10 982 A1 describes a spring leg in which the air-spring chamber is arranged with its longitudinal axis inclined relative to the longitudinal axis of a telescopic shock absorber, to be precise in such a manner that the two casing parts of the air spring, which are connected to one another by a U-bellows, are essentially coaxial with respect to one another. In order to be able to maintain this coaxiality, at least to a very great extent, even when suspension deflections occur, the lower casing part coupled to the telescopic shock absorber cylinder arranged at the bottom is connected in a laterally resilient manner to the cylinder by the interposition of an elastomeric shear spring arrangement, that is to say the lower casing part of the air-spring system can be displaced transversely to the axis of the telescopic shock absorber.

An object of the invention, then, is to provide, for air-spring legs of the type initially indicated above, an improved design in which the bellows are loaded distinctly more lightly in the radial direction.

This object is achieved according to the invention in that, by its end remote from the bellows, the casing part on the cylinder side is arranged for wobbling movement on the cylinder of the telescopic element.

The invention is based on the general principle of reducing the radial constraint of the air-spring bellows, or the buckling angle which may occur between the casing parts of the air chamber, by permitting a certain buckling movability between the cylinder and the casing part on the cylinder side, the casing part on the cylinder side always being forced into a central position by the bellows drawn taut by the pneumatic pressure in the air chamber, while undesirable displacements of the casing part on the cylinder side can be excluded.

The design according to the invention advantageously also permits the use of so-called singlelayer rubber bellows, in which only one single layer of threads, with the threads extending in the longitudinal direction, is provided. Bellows of this kind require an inner rolling surface substantially in the form of an outer cylinder, and also an outer rolling surface disposed at a radial distance therefrom and substantially in the form of an inner cylinder surface, that is to say the casing parts of the air chamber must axially overlap one another by means of correspondingly cylindrical parts, so that the bellows can be accommodated in the annular space between the cylindrical parts. In the arrangement according to the invention, with a casing on the cylinder side able to make wobbling movements, even with desirably shorter radial distances between the cylindrical rolling surfaces, it is possible for a collision between these cylindrical parts to be reliably avoided even when the telescopic element makes larger wobbling movements relative to the casing part on the piston side.

In principle, a design of this kind can also be advantageous for two-layer bellows.

Irrespective of the construction of the airspring bellows, the invention is therefore particularly suitable for designs having external guidance of the bellows in question.

In addition, it is advantageous that the ability of the casing part on the cylinder side to make wobbling movements can be achieved with very simple means. In accordance with an advantageous embodiment of the invention, it is possible to arrange on the cylinder of the telescopic element a flange-like collar on which the casing part on the cylinder side is supported for wobbling movement with the interposition of an annular part of elastomer material.

According to a particularly preferred embodiment, the flange-like collar may be in the form of an annular sector of a spherical surface and the casing part on the cylinder side can have a substantially matching annular spherical sector surface, so that the ring of elastomer material is arranged between a spherical outer surface and a spherical inner surface and, during wobbling movements of the casing part on the cylinder side, is subjected substantially only to shear stress.

Other objects, advantages and novel features of the present invention will become apparent from the following detailed description of the invention when considered in conjunction with the accompanying drawings.

BRIEF DESCRIPTION OF THE DRAWINGS

FIG. 1 shows an axial section of a first embodiment of an air-spring leg, positioned with casing parts of the air-spring chamber aligned coaxially to the longitudinal axis of the telescopic element;

FIG. 2 shows the detail II in FIG. 1;

DETAILED DESCRIPTION OF THE DRAWINGS

Figure 3:
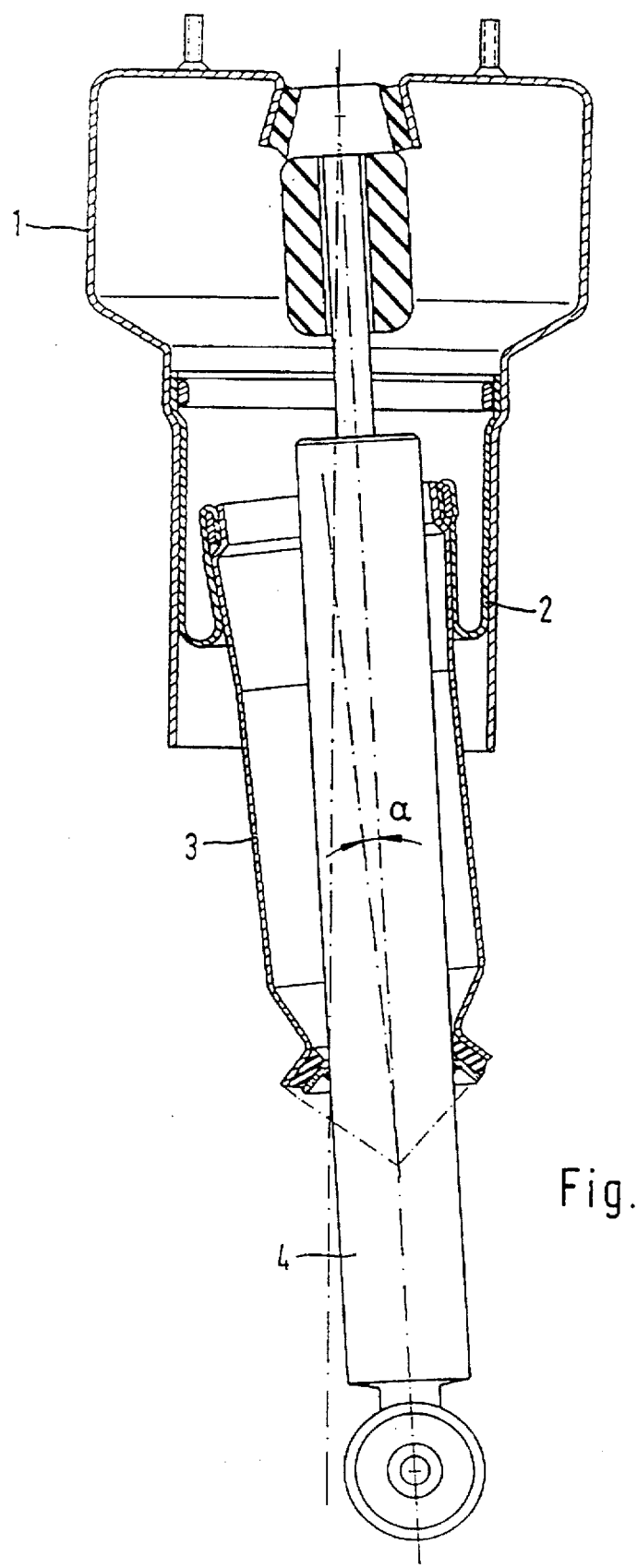
FIG. 3 shows a position of the air-spring leg different from that shown in FIG. 1, the longitudinal axes of the telescopic element and of the casing part on the cylinder side having been swivelled relative to the longitudinal axis of the casing part on the piston side.

The air-spring leg shown in FIG. 1 has an air chamber of variable volume which is surrounded by a first casing part 1 fastened to a vehicle body or chassis (not shown), by a U-bellows 2 and by a second casing part 3, which, in turn, is fastened for wobbling movement to the cylinder of a telescopic shock absorber 4, whose piston rod is fastened for swivelling or wobbling movement to an end face of the casing 1 or to the chassis or body of the vehicle (not shown), while the bottom end of the cylinder of the telescopic shock absorber 4 is connected to a vehicle axle or to axle guide parts (not shown). The casing parts 1 and 3 overlap one another in the axial direction by means of substantially cylindrical portions which serve as inner and outer rolling surfaces respectively for the bellows 2 arranged between these cylindrical portions. In the event of an inward spring stroke, the casing part 3 moves upwards in FIG. 1, relative to the casing part 1, while the bellows 2 is rolled to a corresponding extent off the inner cylinder surface of the casing part 1 and rolled onto the outer cylinder surface of the casing part 3. In the event of an outward stroke, the reverse applies correspondingly.

For the purpose of fastening the casing part 3 on the cylinder of the telescopic shock absorber 4 for wobbling movement, there is arranged on the cylinder part of the latter a flange-like collar 6 which has the shape of an annular sector of a spherical surface, the outer side of the spherical surface facing the casing part 3. On this collar 6 lies a ring 5 of elastomer material, on which the casing part 3 rests by an edge which is arranged on it and which likewise has the shape of an annular spherical sector, the inner side of the sphere facing the collar 6. The ring 5 accordingly lies between two spherical surfaces concentric to one another. Since that edge of the casing part 3 which lies on the ring 5 has an inside diameter larger than the outside diameter of the cylinder part of the telescopic shock absorber 4, the casing part 3 can make wobbling movements relative to the telescopic shock absorber 4, as is shown by way of example in FIG. 3. Such wobbling movements occur when the bottom end of the telescopic shock absorber 4 is moved sideways in such a manner that the longitudinal axis of the shock absorber 4 forms an angle to the center line of the casing part 1. In such a case, the center line of the casing part 3 forms an angle to the longitudinal axis of the telescopic shock absorber 4. The top end of the casing part 3 is then forced into a central position, relative to the casing part 1, by the bellows 2, which is drawn more or less taut by the air pressure in the air chamber.

During these wobbling movements, the ring 5 of elastomer material is subjected substantially only to shear stress.

The leaktightness of the air chamber on the ring 5 can be ensured solely by means of the pressing forces by which the casing part 3 is forced downwards by the pneumatic pressure of the air chamber. The magnitude of these pressing forces is determined, on the one hand, by the difference in cross-section of the casing parts 1 and 3 in the region of the bellows 2 and, on the other hand, by the difference in cross-section between the top and bottom ends of the casing part 3.

Figure 4:
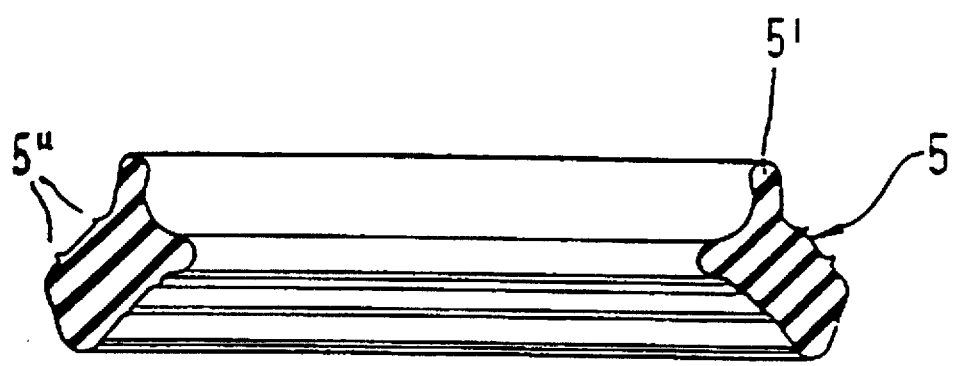
FIG. 4 shows a section of the ring of elastomer material serving for the mounting for wobbling movement of the casing part on the cylinder side.

Particularly good leaktightness can be ensured if the ring 5 has the cross-section shown in FIG. 4 and, in particular, grips around the bottom end of the casing part 3 on the inner side by means of a lip 5' and/or is provided with fine ribs 5".

As a modification of the arrangement shown in FIGS. 1 to 4, the flange-like collar on the cylinder part of the shock absorber 4 and that edge of the casing part 3 which rests on the elastomer ring 5 may also be made conical in shape, while selection of the steepness of the conicity and of the hardness (Shore hardness) of the elastomer material make it possible to obtain practically any desired cardanic stiffness of the casing part 3 relative to the cylinder of the shock absorber 4.

Figure 5:
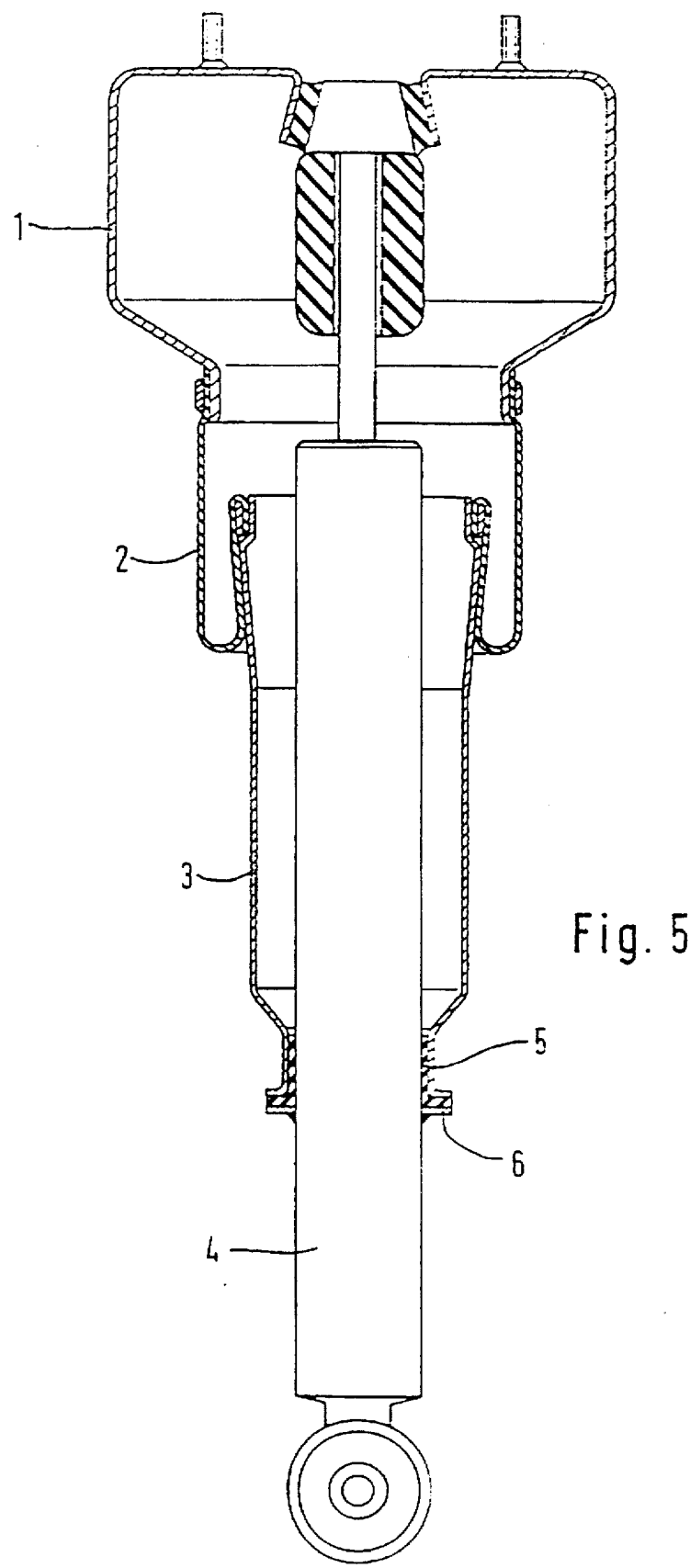
FIG. 5 shows an embodiment which is modified in relation to FIG. 1 and which has slight wobbling movability of the air-spring casing part on the cylinder of the shock absorber.

The embodiment according to FIG. 5, differs from the embodiment described above essentially in that the collar 6 arranged on the cylinder of the telescopic shock absorber 4 is in the form of a flat annular disc and the ring 5 of elastomer material, on the one hand, comprises a thick annular-disc-shaped part, which is arranged between said collar 6 and a facing, similar collar on the casing part 3, and, on the other hand, has a cylindrical portion filling an annular space between the outer circumference of the cylinder of the telescopic shock absorber 4 and a cylindrical bottom end of the casing 3. A simple and leaktight mounting which is relatively resistant to wobbling movements is thus obtained.

In the spring leg of FIG. 5, a conventional, two-layer bellows 2 is provided, which is arranged on the casing part 1 without radially external guidance. For this reason, the casing part 3 must be arranged relatively rigidly on the cylinder of the shock absorber 4.

In all exemplary embodiments, the movability of the casing part 3 relative to the cylinder of the telescopic shock absorber 4 can be adjusted by selection of the hardness and dimensions of the ring 5 or else by the shaping of the parts lying against the ring, in particularly a configuration of these parts which deviates from the spherical and is modified so as to be more conical in shape.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air-spring leg comprising:

a telescopic element in the form of a shock absorber and which comprises a cylinder, a piston retractable therein, and an air chamber of variable volume which is combined with the telescopic element, a first casing part connected to the piston and surrounding at least a portion of said piston, a second casing part fastened to the cylinder, a bellows arranged between the casing parts, and which substantially concentrically surrounds the telescopic element, at least over an axial portion, wherein one of said casing parts has a diameter smaller than that of the other casing part and is axially retractable into the other casing part during inward spring strokes, and wherein the second casing part is arranged by its end remote from the bellows for wobbling movement on the cylinder of the telescopic element.

2. An air-spring leg according to claim 1, wherein a flanged collar is arranged on a peripheral surface of the cylinder of the telescopic element, and wherein a flanged annular region on the second casing part is connected for wobbling movement by means of an annular part of elastomer material to said collar.

3. An air-spring leg according to claim 2, wherein the flanged collar and flanged annular region have flat flanged surfaces, the annular part of elastomer material being arranged in at least one of the following positions between said flat flanged surfaces on the cylinder of the telescopic element and on the second casing part on the cylinder side and in an annular gap formed between the cylindrical outer surface of the cylinder of the telescopic element and a cylindrical inner peripheral surface on the second casing part on the cylinder side.

4. An air-spring leg according to claim 3, wherein the casing parts axially overlap one another by means of cylinder segments, and wherein the bellows are U-bellows arranged in an annular space between the cylinder segments, the U-bellows being rollably supported on the outer side of the radially inner cylinder segment and the inner side of the radially outer cylinder segment.

5. An air-spring leg according to claim 2, wherein a leak tightness of the air chamber at the annular part of the elastomer material is insured solely by pressing forces by which the second casing part is forced against the flanged collar via pneumatic pressure of the air chamber.

6. An air-spring leg according to claim 2, wherein the collar has a shape of an annular sector of a spherical surface, an outer surface of which faces the annular part, and the second casing part on the cylinder side rests on the annular part with the flanged annular region which forms a sector of a spherical inner surface concentric to the spherical surface of the collar.

7. An air-spring leg according to claim 6, wherein the casing parts axially overlap one another by means of cylinder segments, and wherein the bellows are U-bellows arranged in an annular space between the cylinder segments, the U-bellows being rollably supported on the outer side of the radially inner cylinder segment and the inner side of the radially outer cylinder segment.

8. An air-spring leg according to claim 2, wherein the collar faces the annular part by a conical outer surface and the second casing part on the cylinder side rests on the annular part by a conical edge.

9. An air-spring leg according to claim 8, wherein the casing parts axially overlap one another by means of cylinder segments, and wherein the bellows are U-bellows arranged in an annular space between the cylinder segments, the U-bellows being rollably supported on the outer side of the radially inner cylinder segment and the inner side of the radially outer cylinder segment.

10. An air-spring leg according to claim 2, wherein the casing parts axially overlap one another by means of cylinder segments, and wherein the bellows are U-bellows arranged in an annular space between the cylinder segments, the U-bellows being rollably supported on the outer side of the radially inner cylinder segment and the inner side of the radially outer cylinder segment.

11. An air-spring leg according to claim 1, wherein the casing parts axially overlap one another by means of cylinder segments, and wherein the bellows are U-bellows arranged in an annular space between the cylinder segments, the U-bellows being rollably supported on the outer side of the radially inner cylinder segment and the inner side of the radially outer cylinder segment.

* * * * *